United States Patent
Yang et al.

(10) Patent No.: US 12,482,537 B2
(45) Date of Patent: Nov. 25, 2025

(54) **SYSTEM OF PREDICTING SENSITIVITY OF *KLEBSIELLA* AGAINST MEROPENEM AND METHOD**

(71) Applicants: Peking Union Medical College Hospital, Chinese Academy of Medical Sciences, Beijing (CN); Hangzhou Jieyi Biotechnology Company Limited, Hanzhou (CN)

(72) Inventors: Qiwen Yang, Beijing (CN); Jing Chen, Beijing (CN); Wei Yu, Beijing (CN); Jun Wang, Beijing (CN); Xiaobing Chu, Beijing (CN); Shiyu Chen, Beijing (CN); Qian Zhang, Beijing (CN); Yao Yao, Beijing (CN)

(73) Assignees: Peking Union Medical College Hospital, Chinese Academy of Medical Sciences, Beijing (CN); Hangzhou Jieyi Biotechnology Company Limited, Hanzhou (CN)

( * ) Notice: Subject to any disclaimer, the term of this patent is extended or adjusted under 35 U.S.C. 154(b) by 0 days.

(21) Appl. No.: 18/523,698

(22) Filed: Nov. 29, 2023

(65) Prior Publication Data
US 2024/0274302 A1    Aug. 15, 2024

(30) Foreign Application Priority Data
Feb. 6, 2023    (CN) .......................... 202310065167.5

(51) Int. Cl.
*G16B 25/10*     (2019.01)
*G01N 33/569*    (2006.01)
*G16H 70/60*     (2018.01)

(52) U.S. Cl.
CPC ............. *G16B 25/10* (2019.02); *G16H 70/60* (2018.01); *G01N 33/56916* (2013.01); *G01N 2333/26* (2013.01)

(58) Field of Classification Search
CPC ............... G16B 25/10; G01N 2333/26; G01N 33/56916
See application file for complete search history.

(56) References Cited

U.S. PATENT DOCUMENTS 11,000,582 B2 *  5/2021  Burkhardt .......... A61K 39/0266
11,233,601 B2    1/2022  Salah et al.
(Continued)

FOREIGN PATENT DOCUMENTS

CN    107077534 A    8/2017
CN    107921114 A    4/2018
(Continued)

OTHER PUBLICATIONS

Alcock et al, 'CARD 2023: expanded curation, support for machine learning, and resistome prediction at the Comprehensive Antibiotic Resistance Database', Nucleic Acids Research 51: 690-699, Oct. 2022 (Year: 2022).*
(Continued)

*Primary Examiner* — Jesse P Frumkin
*Assistant Examiner* — Theodore Charles Striegel
(74) *Attorney, Agent, or Firm* — Hemisphere Law, PLLC; Zhigang Ma (57) ABSTRACT

A system of predicting sensitivity of *Klebsiella* against meropenem includes comprises a computer readable storage medium on which is stored a computer program. An Exp (−k) power value calculation method is implemented when the computer program is executed by a processor. The Exp(−k) power value calculation method comprises-in-
(Continued)

cludes following computing steps: S1: k value is calculated according to formula I, $$k = -1.44 + 0.708 \times \left(\frac{C1 - 0.252}{2.567}\right) - 0.660 \times \left(\frac{C2 - 0.981}{5.690}\right) + 0.088 \times \left(\frac{C3 - 0.952}{0.652}\right) + 3.048 \times \left(\frac{C4 - 0.469}{1.095}\right) - 0.460 \times \left(\frac{C5 - 0.296}{0.670}\right)$$

S2: Exp(−k) power value with natural constant e as base and −k as exponent is calculated.

6 Claims, 2 Drawing Sheets

(56) References Cited

U.S. PATENT DOCUMENTS

| | | | |
|---|---|---|---|
| 11,253,745 B2* | 2/2022 | Spelman | A63B 21/0442 |
| 11,872,273 B2 | 1/2024 | Burkhardt et al. | |
| 2015/0259729 A1* | 9/2015 | Walker | G16H 40/60 435/6.12 |
| 2016/0085912 A1* | 3/2016 | Jones | G16H 50/80 702/19 |
| 2020/0286590 A1 | 9/2020 | Jones et al. | |
| 2023/0141128 A1 | 5/2023 | Jaillard Dancette et al. | |

FOREIGN PATENT DOCUMENTS

| | | | | |
|---|---|---|---|---|
| CN | 114898800 A | 8/2022 | | |
| WO | WO-2020243644 A1 * | 12/2020 | ............. | C12Q 1/689 |
| WO | WO-202180768 A1 | 4/2021 | | |
| WO | WO-2021180771 A1 | 9/2021 | | |

OTHER PUBLICATIONS

Buchfink et al, 'Sensitive protein alignments at tree-of-life scale using DIAMOND', Nature Methods 18: 366-368, Apr. 2021 (Year: 2021).*

Kent, 'BLAT—The BLAST-Like Alignment Tool', Genome Research 12: 656-664, 2002 (Year: 2002).*

Lu et al, 'Spread of the florfenicol resistance floR gene among clinical Klebsiella pneumoniae isolates in China', Antimicrobial Resistance and Infection Control 7: 127, 2018 (Year: 2018).*

Prjibelski et al, 'Using SPAdes De Novo Assembler', Current Protocols in Bioinformatics 70: e102, 2021 (Year: 2021).*

Rondinelli, 'Variations in Carbapenem Resistance Associated with the Verona Integron-Encoded Metallo-b-lactamase Across the Order Enterobacterales' [MSc. thesis], Queen's University, Sep. 2022 (Year: 2022).*

Shirong Li, et al.; First Report of $bla_{CTX-M-167}$, $bla_{SHV-1}$, and $bla_{TEM-1B}$ Carrying *Klebsiella pneumonia* Showing High-Level Resistance to Carbapenems. Jul. 7, 2022; 6 pages.

First Review Opinion Notice for Chinese (and its English machine translation) application No. 202310065167.5 that is the parent application to the instant application; dated Mar. 17, 2023; 10 pages.

* cited by examiner

SYSTEM OF PREDICTING SENSITIVITY OF *KLEBSIELLA* AGAINST MEROPENEM AND METHOD

TECHNICAL FIELD

This present invention belongs to bioinformatics field, specifically refers to a system and method of predicting sensitivity of *Klebsiella* against MeropeneM.

BACKGROUND

Antibiotics were once a "secret weapon" for humans to fight against many diseases. In the late 19th and early 20th centuries, the discovery of a series of antibiotics greatly increased human lifespan. In recent years, with the continuous application of antibiotics, drug abuse has gradually emerged, which leads to an increase in clinical antibiotic resistance and adverse reactions, and brings a heavy burden to the global economy. Effectively controlling the abuse of antibiotics in healthcare is an important link in addressing the global issue of antibiotic resistance.

Pathogenic microorganisms refer to microorganisms that can invade the human body, and cause infections or even infectious diseases, which are also known as pathogens. Pathogenic microorganisms mainly include bacteria, viruses, fungi, parasites, mycoplasma, chlamydia, rickettsia, spirochetes, etc. There are various types of microbial samples. Intestinal samples include feces, mucous membranes, etc. Liquid samples include urine, blood, cerebrospinal fluid, saliva, sputum, alveolar lavage fluid, amniotic fluid, etc. Swab samples include samples from oral cavity, reproductive tract, skin, etc. Other samples include tissues, liver, eyes, placenta, etc.

The Latin scientific name of Genus *Klebsiella* is *Klebsiella trevisan*, and its systematic classification level is Genus. It is a straight bacterium with a diameter of 0.3-1.0 μm. 0.6-6.0 in length μM, and it's single, paired, or short chain arrangement. Currently reported strains of this genus include *Klebsiella pneumoniae, Klebsiella aerogenes, Klebsiella oxytoca, Klebsiella quasipneumoniae, Klebsiella variicola, Klebsiella michiganensis*, etc.

Among them, *Klebsiella pneumoniae*, as a model strain of the genus Genus *Klebsiella*, is widely present in the environment, and is a common opportunistic pathogen that easily colonizes the respiratory and intestinal tracts of patients, and causes infections in multiple parts of the digestive tract, respiratory tract, blood, etc. It is one of the pathogenic bacteria that cause human pneumonia and is also one of the common drug-resistant bacteria in hospitals. According to a study by the Second Military Medical University, the resistance rate against meropenem of carbapenem resistant *Klebsiella pneumoniae* isolated from 2014 to 2017 to was 62.5% (252/403).

Meropenem is a widely antibacterial and injectable antibiotic, which is used to treat various infections including meningitis and pneumonia. It is a type of β Lactam antibiotics and belongs to the category of carbapenems. Meropenem has a wide antibacterial spectrum, strong antibacterial activity, and is stable to βlactamase.

Bacterial drug sensitivity testing is currently the most commonly used method for detecting bacterial resistance in clinic and laboratory both domestically and internationally. There are methods such as paper disc method, agar dilution method, broth dilution method, and concentration gradient method. Except for the paper disc method, all other methods can obtain relatively accurate minimum inhibitory concentration (MIC) of drugs. It's required firstly to obtain pure culture in the bacterial drug sensitivity test, which is not suitable for difficult to cultivate and non cultured bacteria, and takes a long time. Sometimes, it is difficult to meet the current clinical needs for rapid diagnosis and targeted treatment of severe and emergency infections. The traditional detection and identification methods of pathogenic microorganisms fail to meet the comprehensive needs of wide coverage, speed, and accuracy. The diagnosis and treatment of infectious diseases are mainly based on empirical and directional methods. Clinical doctors and patients urgently need innovative detection methods to identify infectious pathogens more comprehensively, accurately, and quickly, which can assist in diagnosis and reasonable standardized medication treatment, shorten treatment courses, reduce mortality rates, and reduce medical costs.

With the promotion of emerging technologies such as PCR technology, whole genome sequencing technology, microfluidic technology, VITEK-2 compact fully automated bacterial identification/drug sensitivity system, the exploration of new technologies for bacterial resistance detection is gradually deepening, and various new technologies and methods for bacterial resistance detection are becoming increasingly mature. Although the VITEK-2 compact fully automated bacterial identification/drug sensitivity system is simple and fast, its accuracy in bacterial identification/drug sensitivity evaluation is influenced by the sample status and bacterial culture, and its usage cost is relatively high.

Therefore, there is an urgent need to develop a system and method in this field that can quickly, accurately, and cost-effectively predict the sensitivity of *Klebsiella* strains against meropenem.

SUMMARY

In response to the aforementioned shortcomings and requirements of prior art in this field, the present invention aims to provide a system and method of predicting sensitivity of *Klebsiella* against MeropeneM.

Technical solution of the present invention is as follows:

A system of predicting sensitivity of *Klebsiella* against MeropeneM, comprising: computing unit; said computing unit comprises: computer readable storage medium, which is stored with computer program, characterized in that, an Exp (−k) power value calculation method is implemented when said computer program is executed by processor; said Exp (−k) power value calculation method comprises following computing steps:

S1: k value is calculated according to formula I:

$$k = 1.33 + 0.708 \times \left(\frac{C1 - 0.252}{0.757}\right) - 0.660 \times \left(\frac{C2 - 0.951}{0.090}\right) + 0.088 \times \left(\frac{C3 - 0.952}{0.103}\right) + 3.048 \times \left(\frac{C4 - 0.469}{1.090}\right) - 0.460 \times \left(\frac{C5 - 0.196}{0.670}\right)$$

Formula I

S2: Exp(−k) power value with natural constant e as base and −k as exponent is calculated; in formula I, C1 is the number of mphA gene copies in a candidate *Klebsiella* strain, C2 is the number of marA gene copies in a candidate *Klebsiella* strain, C3 is the number of *Klebsiella pneumoniae* KpnE gene copies in a candidate *Klebsiella* strain, C4 is the number of KPC-1 gene copies in a candidate *Klebsiella* strain, C5 is the number of floR gene copies in a candidate *Klebsiella* strain.

The system of predicting sensitivity of *Klebsiella* against MeropeneM, also comprising: result output unit; the computing unit transmit the calculated Exp(−k) power value to the result output unit, the result output unit recognizes Exp(−k) power value and outputs result;

preferably, said natural constant e=2.718281828459045.

the result output unit outputs resistant result R when recognizing Exp(−k) power value <1;

the result output unit outputs sensitive result S when recognizing Exp(−k) power value ≥1;

the result output unit and the computing unit are communicated through data-path, Exp(−k) power value calculated by the computing unit is transmitted to the result output unit;

preferably, said sensitive result S refers to that the candidate *Klebsiella* strain is sensitive to MeropeneM, and said resistant result R refers to that the candidate *Klebsiella* strain is resistant against MeropeneM.

The system of predicting sensitivity of *Klebsiella* against MeropeneM, also comprising: experiment unit and data input unit;

the experiment unit and data input unit are communicated through data-path; the experiment unit outputs experiment results which are transmitted to the data input unit and transformed to independent variables;

said data input unit and computing unit are communicated through data-path;

independent variables are transmitted to the computing unit.

said independent variables include: values of C1, C2, C3, C4, C5;

preferably, said experiment results comprise: the number of mphA gene copies in the candidate *Klebsiella* strain, the number of marA gene copies in the candidate *Klebsiella* strain, the number of *Klebsiella pneumoniae* KpnE gene copies in the candidate *Klebsiella* strain, the number of KPC-1 gene copies in the candidate *Klebsiella* strain, the number of floR gene copies in the candidate *Klebsiella* strain.

A method of predicting sensitivity of *Klebsiella* against MeropeneM, comprising:

S1: k value is calculated according to formula I:

$$k = -1.44 + 0.708 \times \left(\frac{C1 - 0.223}{0.757}\right) - \\ 0.660 \times \left(\frac{C2 - 0.951}{0.090}\right) + 0.088 \times \left(\frac{C3 - 0.952}{0.103}\right) + \\ 3.048 \times \left(\frac{C4 - 0.469}{1.090}\right) - 0.460 \times \left(\frac{C5 - 0.196}{0.670}\right)$$
Formula I S2: Exp(−k) power value with natural constant e as base and −k as exponent is calculated;

in formula I,

C1 is the number of mphA gene copies in a candidate *Klebsiella* strain,

C2 is the number of marA gene copies in a candidate *Klebsiella* strain,

C3 is the number of *Klebsiella pneumoniae* KpnE gene copies in a candidate *Klebsiella* strain, C4 is the number of KPC-1 gene copies in a candidate *Klebsiella* strain, C5 is the number of floR gene copies in a candidate *Klebsiella* strain;

a predicting result corresponding to Exp(−k) power value<1 is the candidate *Klebsiella* strain sensitive to MeropeneM, and a predicting result corresponding to Exp(−k) power value≥1 is the candidate *Klebsiella* strain resistant against MeropeneM.

said natural constant e=2.718281828459045;

the number of mphA, marA, *Klebsiella pneumoniae* KpnE, KPC-1, floR gene copies in the candidate *Klebsiella* strain are obtained through a second-generation high-throughput sequencing method.

the number of gene copies in the candidate *Klebsiella* strain-depth of gene contigs/depth of genome contigs;

preferably, said genome contigs is a longest contigs segment assembled from sequencing results by SPAdes v3.13.0 software;

said depth of genome contigs is a depth of genome contigs calculated by SPAdes v3.13.0 software;

said depth of gene contigs refers to a sum of depths of each contig which has said gene copies and said gene is located on;

preferably, each contig which has said gene copies is annotated by blat(v.36) software and diamond (v2.0.4.142) software through CARD database alignment between said gene IDs and protein sequence;

preferably, depths of each contig which has said gene copies and said gene is located on are calculated through SPAdes v3.13.0 software.

One aspect of the present invention proposes a method of predicting sensitivity of *Klebsiella* against MeropeneM.

In this invention, after routine processing of the obtained microbial samples, necessary steps such as DNA extraction and sequencing can be carried out. Through bioinformatics process analysis, the state of the relevant features of the *Klebsiella* prediction system in the samples can be obtained. The feature state information can be imported into the system to predict the drug sensitivity of the samples. Compared to traditional methods, it has advantages such as simple operation, short detection time, and accurate species identification.

In order to effectively evaluate the performance of a prediction system, it is necessary to establish a dataset that is not involved in the establishment of the prediction system, and evaluate the accuracy of the prediction system on this dataset. This independent dataset is called the test set. The evaluation methods for system prediction effectiveness include F1 score, Precision, Recall, and confusion matrix.

The method of the present invention also has the following advantages:

The present invention utilizes a test set to evaluate the accuracy of the system. The average accuracy of the method is 0.994, F1 score is 0.984, and recall score is 0.968. On the one hand, the present invention is less affected by subjective factors from such as operators, and has good detection stability; on the other hand, it achieves rapid and accurate identification of infectious pathogens and prediction of drug sensitivity of the test samples, meanwhile, it assists in diagnosis and rational & standardized medication treatment, has high throughput, and reduce medical costs.

EMBODIMENTS

In order to facilitate the understanding of the present invention, a more comprehensive description of the present invention will be provided in the embodiments below. Unless otherwise defined, all technical and scientific terms used in this article have the same meanings as those commonly understood by a person skilled in the art of the present invention. The terms used in the specification of the present invention in this article are only for the purpose of describing specific embodiments and are not intended to limit the present invention.

The reagents used in the following embodiments are commercially available unless otherwise specified.

Sources of Biomaterials

The 160 samples used in the experimental example of the present invention are pure cultures of *Klebsiella* strains isolated from clinical blood culture, from Beijing Union Medical College Hospital of the Chinese Academy of Medical Sciences.

All tested strains (strains) were identified as *Klebsiella* (scientific name: Genus *Klebsiella*, Latin name: *Klebsiella trevisan*, systematic classification level: Genus) by mass spectrometry MALDI-TOF MS.

On the Illumina Novaseq NGS sequencing platform, these strains include 122 *Klebsiella pneumoniae* strains, 18 *Klebsiella aerogenes* strains, 7 *Klebsiella oxytoca* strains, 6 *Klebsiella quasipneumoniae* strains, 4 *Klebsiella variicola* strains, and 3 *Klebsiella michiganensis* strains, all of them are reported strains of the *Klebsiella* genus.

The above strains or strains can be obtained from common cases of *Klebsiella pneumoniae* pneumonia or from the applicant's laboratory. The applicant promises to distribute strains to the public within 20 years from the application date of the present invention for verifying the technical effects of the present invention.

Examples Group 1. System of Resistance Predicting System

Figure 1:
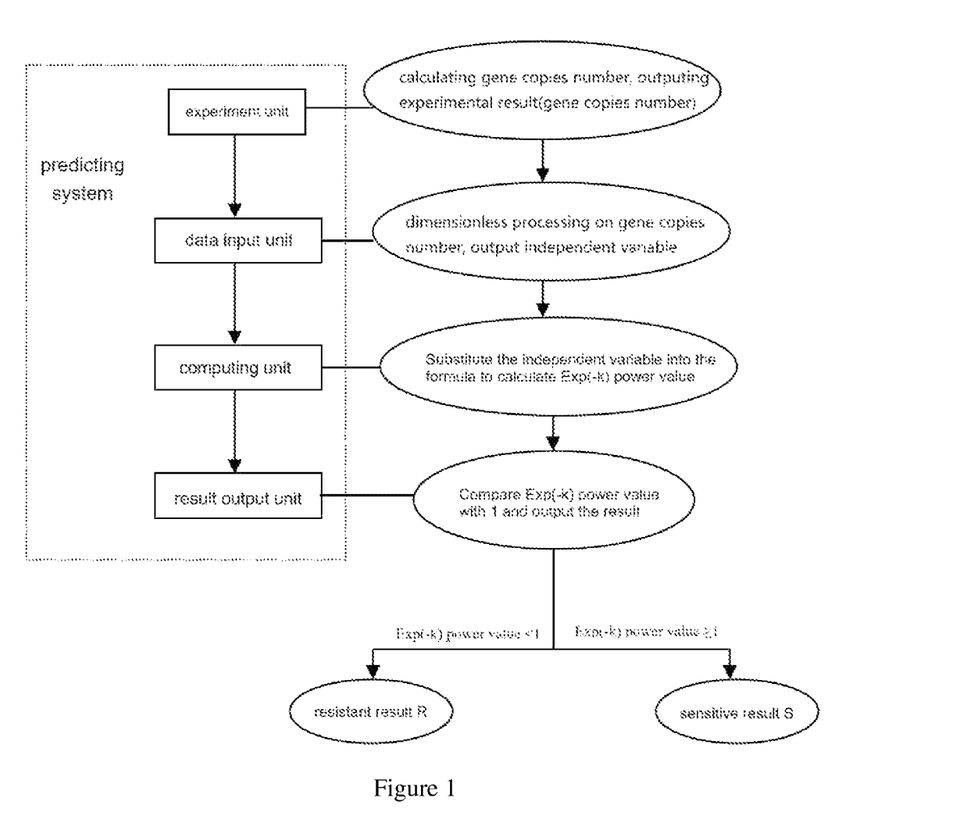
FIG. 1 is a schematic diagram of the structure of the drug resistance prediction system provided by some examples of the present invention (in dashed boxes) and its workflow diagram.
Figure 2:
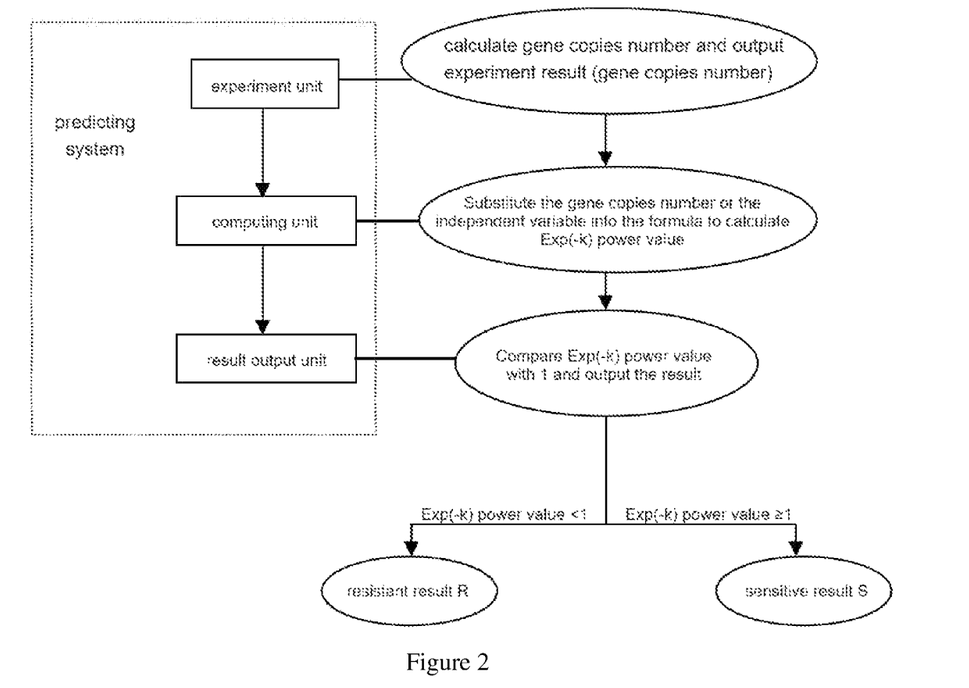
FIG. 2 is a schematic diagram of the structure of the drug resistance prediction system provided by other examples of the present invention (in dashed boxes) and its workflow diagram.

This group of examples provides a system of predicting sensitivity of *Klebsiella* against MeropeneM. All examples of this group possesses the following common features: as shown in FIG. 1 and FIG. 2, the system of predicting sensitivity of *Klebsiella* against MeropeneM comprising: computing unit; said computing unit comprises: computer readable storage medium, which is stored with computer program, characterized in that, an Exp (−k) power value calculation method is implemented when said computer program is executed by processor; said Exp(−k) power value calculation method comprises following computing steps:

S1: k value is calculated according to formula I:

$$k = -1.44 + 0.708 \times \left(\frac{C1 - 0.223}{0.757}\right) - 0.660 \times \left(\frac{C2 - 0.951}{0.090}\right) + \\ 0.088 \times \left(\frac{C3 - 0.952}{0.103}\right) + 3.048 \times \left(\frac{C4 - 0.469}{1.090}\right) - \\ 0.460 \times \left(\frac{C5 - 0.196}{0.670}\right)$$

Formula I

S2: Exp(−k) power value with natural constant e as base and −k as exponent is calculated; in formula I, C1 is the number of mphA gene copies in a candidate *Klebsiella* strain, C2 is the number of marA gene copies in a candidate *Klebsiella* strain, C3 is the number of *Klebsiella pneumoniae* KpnE gene copies in a candidate *Klebsiella* strain, C4 is the number of KPC-1 gene copies in a candidate *Klebsiella* strain, C5 is the number of floR gene copies in a candidate *Klebsiella* strain.

In some examples of this invention, said natural constant e=2.718281828459045.

In more specific examples, above genes are all known genes reported in the art, specifically as follows:

mphA gene is mphA gene recorded in "Molecular Characterization of a Multidrug-Resistant *Klebsiella pneumoniae* Strain R46 Isolated from a Rabbit".

marA gene is marA gene recorded in "Correlation of the expression of acrB and the regulatory genes marA, soxS and ramA with antimicrobial resistance in clinical isolates of *Klebsiella pneumoniae* endemic to New York City".

*Klebsiella pneumoniae* KpnE gene is *Klebsiella pneumoniae* KpnE gene recorded in "An unequivocal superbug: PDR *Klebsiella pneumoniae* with an arsenal of resistance and virulence factor genes".

KPC-1 gene is KPC-1 gene recorded in "Novel Carbapenem-Hydrolyzing b-Lactamase, KPC-1, from a Carbapenem-Resistant Strain of *Klebsiella pneumoniae*". floR gene is floR gene recorded in "Spread of the florfenicol resistance floR gene among clinical *Klebsiella pneumoniae* isolates in China".

In further examples, as shown in FIG. 1 and FIG. 2, the system of predicting sensitivity of *Klebsiella* against MeropeneM, also comprising: result output unit; said result output unit outputs sensitive result or resistant result; said sensitive result S refers to that the candidate *Klebsiella* strain is sensitive to MeropeneM, and said resistant result R refers to that the candidate *Klebsiella* strain is resistant against MeropeneM.

the result output unit outputs resistant result R when Exp(−k) power value <1;

the result output unit outputs sensitive result S when Exp(−k) power value ≥1;

Preferably, the result output unit and the computing unit are communicated through data-path;

Preferably, Exp(−k) power value calculated by the computing unit is transmitted to the result output unit.

In more further example, as shown in FIG. 1, the system of predicting sensitivity of *Klebsiella* against MeropeneM, also comprising: experiment unit and data input unit; the experiment unit and data input unit are communicated through data-path; the experiment unit outputs experiment results which are transmitted to the data input unit and transformed to independent variables;

said data input unit and computing unit are communicated through data-path;

independent variables are transmitted to the computing unit through data-path.

In more specific example, said data-path is data transmission carrier well-known to a person skilled in the arts of computer and electronics. The data path can be selected from wired or wireless form, for example, it can be a wired path, line, wireless path, WiFi connection, wireless channel, etc.

Preferably, said independent variables include: values of C1, C2, C3, C4, C5;

Preferably, said experiment results comprise: the number of mphA, marA, *Klebsiella pneumoniae* KpnE, KPC-1, floR gene copies in the candidate *Klebsiella* strain.

The copy number of known genes in known strains can be routinely obtained by a person skilled in the arts of molecular biology and bioinformatics through conventional techniques such as sequencing and bioinformatics analysis. The mphA, marA, *Klebsiella pneumoniae* KpnE, KPC-1, and floR genes involved in the experiment results output by the experiment unit of the prediction system of the present invention are all reported genes in the art, and their gene information and primary structural sequences can be queried through the NCBI website or other known bioinformatics databases. By conducting whole genome sequencing of the candidate *Klebsiella* strain, the numbers of each of the aforementioned genes copies in the strain can be obtained.

In other specific examples, the number of mphA, marA, *Klebsiella pneumoniae* KpnE, KPC-1, floR gene copies in the candidate *Klebsiella* strain are obtained through a second-generation high-throughput sequencing method.

In more specific examples, the number of gene copies in the candidate *Klebsiella* strain=depth of gene contigs/depth of genome contigs;
  preferably, said genome contigs is a longest contigs segment assembled from sequencing results by SPAdes v3.13.0 software;
  said depth of genome contigs is a depth of genome contigs calculated by SPAdes v3.13.0 software;
  said depth of gene contigs refers to a sum of depth of each contig which has said gene copies and said gene is located on;
  preferably, each contig which has said gene copies is annotated by blat(v.36) software and diamond (v2.0.4.142) software through CARD database alignment between said gene IDs and protein sequence;
  preferably, depth of each contig which has said gene copies and said gene is located on are calculated through SPAdes v3.13.0 software.

The second-generation high-throughput sequencing method has a conventional technical meaning that is well-known to a person skilled in the art, while obtaining gene copy numbers using the second-generation high-throughput sequencing method is a conventional technical means that is well-known to a person skilled in the art.

In some specific embodiments, the specific method for calculating the gene copy number is as follows:

Sequencing of strains is conducted by using second-generation high-throughput sequencing methods. The average sequencing depth is about 1 50x, and the approximate sequencing amount for the *Klebsiella* genus is about 1G. Using the depth of contigs obtained and calculated by SPAdes (v3.13.0) assembly software during the assembly process as the standard, the longest contigs segment is defined as the genome segment. Prokka software (1.14.6) is used to conduct gene predicting on contigs, and all gene IDs and protein sequences on contigs are obtained. blat(v.36) software and Diamond (v2.0.4.142) software are respectively used to compare the IDs and protein sequences in the CARD database, sequences with a similarity greater than 90% are positive sequences, and annotation results for all resistance genes are obtained. The number of all gene copies on contigs are calculated using formula II as follows:
Formula II: The Number of all Gene Copies on Said Contigs-Depth of Said Contigs/Depth of Genome Contigs If a gene has two or more genome copies on different or the same contigs, the final number of gene copies is equal to the sum of all calculated number of the gene copies. Examples of calculation methods are as follows:
  assuming that there is only one copy of the KPC-1 gene on all contigs, the number of the KPC-1 gene copies is:
  the number of KPC-1 gene copies=depth of contigs which KPC-1 gene is located on/depth of genome contigs.
  Assuming that the KPC-1 gene has 2 copies on one contigs and no copies on other contigs, the number of the KPC-1 gene copies is:
  the number of KPC-1 gene copies=2× depth of contigs which KPC-1 gene is located on/depth of genome contigs.
  Assuming that the KPC-1 gene has one copy on one contig1 and contig2, but no copies on other contigs, the number of the KPC-1 gene copies is:
  the number of KPC-1 gene copies=depth of contig 1 which KPC-1 gene is located on/depth of genome contigs+ depth of contig 2 which KPC-1 gene is located on/depth of genome contigs.

In more specific embodiments, the result output unit, experiment unit, and data input unit are all set as computer readable storage media on which computer programs are stored.

In some embodiments, when the computer program on the computer readable storage medium of the result output unit is executed by the processor, a method of comparing the Exp (−k) power value with 1 is implemented and the result is output;

That method of comparing the Exp (−k) power value with 1 is implemented and the result is output refers to:
  the result output unit outputs resistant result R when Exp(−k) power value <1;
  the result output unit outputs sensitive result S when Exp(−k) power value ≥1;

In other embodiments, a method for calculating the number of gene copies is implemented when the computer program on the computer readable storage medium of the experiment unit is executed by the processor;

The method for calculating the number of gene copies is a conventional technical means well known to a person skilled in the art, and the specific steps are as follows:
  S1: Take the maximum from depth of the genome contigs calculated by SPAdes v3.13.0 assembly software to obtain the genome contigs;
  S2: Use BLAT (v.36) software and Diamond (v2.0.4.142) software to compare the CDs and protein sequences of a certain gene in the CARD database, and obtain each contigs with that gene copies by annotation;
  S3: SPAdes v3.13.0 assembly software calculates the depth of the gene on each contigs has the gene copies;
  S4: Calculate the sum of the depths of the gene on each contigs has the gene copies to obtain the depth of the contigs where the gene is located;
  S5: Calculate the number of the gene copies according to the following formula, the number of copies=depth of gene contigs/depth of genome contigs.

In some embodiments, the computer program on the computer readable storage medium of the data input unit is executed by the processor to achieve dimensionless processing of the number of gene copies.

The dimensionless processing involves removing data dimensions or data units from the number of gene copies to obtain dimensionless values. Generally speaking, the data dimension or unit of the number of gene copies is: copy, number, or copies.

In other embodiments, as shown in FIG. 2, the system of predicting sensitivity of *Klebsiella* against meropenem may not require a data input unit. The experiment unit is directly connected to the computing unit through a data-path, allowing the number of gene copies (experiment results) or independent variable data calculated by the experiment unit to be directly input into the computing unit for Exp (−k) power value calculation.

Examples Group 2. The Method of Predicting *Klebsiella* Resistant Against MeropeneM of this Invention This group examples provides a method of predicting sensitivity of *Klebsiella* against meropenem. All examples of this group possess the following common features:

S1: k value is calculated according to formula I:

$$k = -1.44 + 0.708 \times \left(\frac{C1 - 0.223}{0.757}\right) - 0.660 \times \left(\frac{C2 - 0.951}{0.090}\right) + 0.088 \times \left(\frac{C3 - 0.952}{0.103}\right) + 3.048 \times \left(\frac{C4 - 0.469}{1.090}\right) - 0.460 \times \left(\frac{C5 - 0.196}{0.670}\right)$$

Formula I

S2: Exp(−k) power value with natural constant e as base and −k as exponent is calculated; in formula I,
C1 is the number of mphA gene copies in a candidate *Klebsiella* strain,
C2 is the number of marA gene copies in a candidate *Klebsiella* strain,
C3 is the number of *Klebsiella pneumoniae* KpnE gene copies in a candidate *Klebsiella* strain,
C4 is the number of KPC-1 gene copies in a candidate *Klebsiella* strain,
C5 is the number of floR gene copies in a candidate *Klebsiella* strain; a predicting result corresponding to Exp(−k) power value<1 is the candidate *Klebsiella* strain sensitive to MeropeneM, and a predicting result corresponding to Exp(−k) power value≥1 is the candidate *Klebsiella* strain resistant against MeropeneM.

In above formula I, e, as a mathematical constant, is the base of a natural logarithmic function, also known as a natural constant, natural base, or Euler number. It is an infinite non recurring decimal, which has the conventional technical meaning commonly understood by a ordinary technical person skilled in the art of mathematics. Its value is approximately: e=2.71828182845904523536.

In some examples of this invention, the value of said natural constant e is 2.718281828459045;

In some specific examples, the number of mphA, marA, *Klebsiella pneumoniae* KpnE, KPC-1, floR gene copies in the candidate *Klebsiella* strain are obtained through a second-generation high-throughput sequencing method.

In more specific examples, the number of gene copies in the candidate *Klebsiella* strain=depth of gene contigs/depth of genome contigs;

preferably, said genome contigs is a longest contigs segment assembled from sequencing results by SPAdes v3.13.0 software;
said depth of genome contigs is a depth of genome contigs calculated by SPAdes v3.13.0 software;
said depth of gene contigs refers to a sum of depths of each contig which has said gene copies and said gene is located on;

preferably, each contig which has said gene copies is obtained by annotation with blat(v.36) software and diamond (v2.0.4.142) software through CARD database alignment between said gene IDs and protein sequence;
preferably, depths of each contigs which has said gene copies and said gene is located on are calculated through SPAdes v3.13.0 software.

The second-generation high-throughput sequencing method has a conventional technical meaning that is well-known to a person skilled in the art, while obtaining the number of gene copies by using the second-generation high-throughput sequencing method is a conventional technical means that is well-known to a person skilled in the art.

In some specific embodiments, the specific method for calculating the number of gene copies is as follows:

Sequencing of strains Is conducted by using second-generation high-throughput sequencing methods. The average sequencing depth is about 150×, and the approximate sequencing amount for the *Klebsiella* genus is about 1G. Using the depth of contigs obtained and calculated by SPAdes (v3.13.0) assembly software during the assembly process as the standard, the longest contigs segment is defined as the genome segment. Prokka software (1.14.6) is used to conduct gene predicting on contigs, and all gene IDs and protein sequences on contigs are obtained. blat(v.36) software and Diamond (v2.0.4.142) software are respectively used to compare the gene IDs and protein sequences in the CARD database, sequences with a similarity greater than 90% are positive sequences, and annotation results for all resistance genes are obtained. The number of all gene copies on contigs are calculated using formula II as follows:
Formula II: The Number of all Gene Copies on Said Contigs=Depth of Said Contigs/Depth of Genome Contigs If a gene has two or more genome copies on different or the same contigs, the final number of gene copies is equal to the sum of all calculated number of the gene copies.

Examples of calculation methods are as follows:
assuming that there is only one copy of the KPC-1 gene on all contigs, the number of the KPC-1 gene copies is:
the number of KPC-1 gene copies=depth of contigs which KPC-1 gene is located on/depth of genome contigs.

Assuming that the KPC-1 gene has 2 copies on one contigs and no copies on other contigs, the number of the KPC-1 gene copies is:
the number of KPC-1 gene copies=2× depth of contigs which KPC-1 gene is located on/depth of genome contigs.

Assuming that the KPC-1 gene has one copy on one contig1 and contig2, but no copies on other contigs, the number of the KPC-1 gene copies is:
the number of KPC-1 gene copies-depth of contig 1 which KPC-1 gene is located on/depth of genome contigs+ depth of contig 2 which KPC-1 gene is located on/depth of genome contigs.

Experimental Example. Performance Evaluation on Predicting System and Predicting Method of this Invention The prediction system of the present invention was evaluated using 160 clinical samples, and the comparison between the broth micro dilution classification results and the system prediction results of 160 clinical samples is shown in Table 1. In the table below, S represents sensitivity and R represents resistance.

TABLE 1

| Sample NO. | Exp(−k) | result of predicting system | Result of Broth micro dilution method |
|---|---|---|---|
| s1 | 0.005025126 | R | R |
| s2 | 7.695652174 | S | S |
| s3 | 18.60784314 | S | S |
| s4 | 18.60784314 | S | S |
| s5 | 22.25581395 | S | S |
| s6 | 22.25581395 | S | S |
| s7 | 22.25581395 | S | S |
| s8 | 23.3902439 | S | S |
| s9 | 22.25581395 | S | S |
| s10 | 10.11111111 | S | S |
| s11 | 18.23076923 | S | S |
| s12 | 22.25581395 | S | S |
| s13 | 24.64102564 | S | S |
| s14 | 23.3902439 | S | S |
| s15 | 8.433962264 | S | S |
| s16 | 19.83333333 | S | S |
| s17 | 22.25581395 | S | S |
| s18 | 30.25 | S | S |
| s19 | 22.25581395 | S | S |
| s20 | 22.80952381 | S | S |
| s21 | 8.259259259 | S | S |
| s22 | 22.25581395 | S | S |
| s23 | 0.10864745 | R | R |
| s24 | 16.24137931 | S | S |
| s25 | 0.023541453 | R | R |
| s26 | 0.027749229 | R | R |
| s27 | 0.886792453 | R | R |
| s28 | 22.25581395 | S | S |
| s29 | 22.25581395 | S | S |
| s30 | 18.60784314 | S | S |
| s31 | 22.25581395 | S | S |
| s32 | 19.40816327 | S | S |
| s33 | 0.015228426 | R | R |
| s34 | 16.24137931 | S | S |
| s35 | 14.15151515 | S | S |
| s36 | 22.25581395 | S | S |
| s37 | 0.092896175 | R | R |
| s38 | 22.25581395 | S | S |
| s39 | 22.25581395 | S | S |
| s40 | 22.80952381 | S | S |
| s41 | 11.5 | S | S |
| s42 | 23.3902439 | S | S |
| s43 | 22.25581395 | S | S |
| s44 | 21.72727273 | S | S |
| s45 | 22.25581395 | S | S |
| s46 | 22.25581395 | S | S |
| s47 | 22.25581395 | S | S |
| s48 | 22.25581395 | S | S |
| s49 | 0.098901099 | R | R |
| s50 | 22.25581395 | S | S |
| s51 | 22.25581395 | S | S |
| s52 | 13.28571429 | S | S |
| s53 | 22.25581395 | S | S |
| s54 | 18.60784314 | S | S |
| s55 | 65.66666667 | S | S |
| s56 | 22.25581395 | S | S |
| s57 | 0.011122346 | R | R |
| s58 | 0.078748652 | R | R |
| s59 | 22.25581395 | S | S |
| s60 | 12.33333333 | S | S |
| s61 | 22.25581395 | S | S |
| s62 | 15.66666667 | S | S |
| s63 | 16.85714286 | S | S |
| s64 | 22.25581395 | S | S |
| s65 | 22.25581395 | S | S |
| s66 | 22.25581395 | S | S |
| s67 | 9.309278351 | S | S |
| s68 | 10.62790698 | S | S |
| s69 | 16.24137931 | S | S |
| s70 | 10.11111111 | S | S |
| s71 | 22.25581395 | S | S |
| s72 | 0.022494888 | R | R |
| s73 | 22.25581395 | S | S |
| s74 | 22.25581395 | S | S |
| s75 | 22.25581395 | S | S |
| s76 | 21.72727273 | S | S |
| s77 | 22.25581395 | S | S |
| s78 | 20.73913043 | S | S |
| s79 | 0.026694045 | R | R |
| s80 | 22.25581395 | S | S |
| s81 | 22.25581395 | S | S |
| s82 | 22.25581395 | S | S |
| s83 | 18.60784314 | S | S |
| s84 | 4.076142132 | S | S |
| s85 | 0.338688086 | R | R |
| s86 | 22.25581395 | S | S |
| s87 | 14.15151515 | S | S |
| s88 | 13.92537313 | S | S |
| s89 | 110.1111111 | S | S |
| s90 | 4.952380952 | S | S |
| s91 | 18.60784314 | S | S |
| s92 | 22.25581395 | S | S |
| s93 | 22.25581395 | S | S |
| s94 | 22.25581395 | S | S |
| s95 | 18.60784314 | S | S |
| s96 | 22.25581395 | S | S |
| s97 | 22.25581395 | S | S |
| s98 | 22.25581395 | S | S |
| s99 | 0.051524711 | R | R |
| s100 | 0.03950104 | R | R |
| s101 | 22.80952381 | S | S |
| s102 | 22.25581395 | S | S |
| s103 | 5.451612903 | S | S |
| s104 | 22.25581395 | S | S |
| s105 | 22.80952381 | S | S |
| s106 | 22.80952381 | S | S |
| s107 | 22.25581395 | S | S |
| s108 | 7.771929825 | S | S |
| s109 | 11.5 | S | S |
| s110 | 0 | R | R |
| s111 | 22.25581395 | S | S |
| s112 | 22.25581395 | S | S |
| s113 | 11.19512195 | S | S |
| s114 | 23.3902439 | S | S |
| s115 | 21.22222222 | S | S |
| s116 | 22.25581395 | S | S |
| s117 | 22.25581395 | S | S |
| s118 | 17.86792453 | S | S |
| s119 | 9.526315789 | S | S |
| s120 | 22.25581395 | S | S |
| s121 | 36.03703704 | S | S |
| s122 | 22.80952381 | S | S |
| s123 | 22.25581395 | S | S |
| s124 | 22.25581395 | S | S |
| s125 | 7.928571429 | S | S |
| s126 | 0.02145046 | R | R |
| s127 | 22.25581395 | S | S |
| s128 | 15.39344262 | S | S |
| s129 | 22.25581395 | S | S |
| s130 | 0.007049345 | R | R |
| s131 | 14.15151515 | S | S |
| s132 | 22.25581395 | S | S |
| s133 | 0.100110011 | R | R |
| s134 | 2.448275862 | S | R |
| s135 | 30.25 | S | S |
| s136 | 23.3902439 | S | S |
| s137 | 0.034126163 | R | R |
| s138 | 0.009081736 | R | R |
| s139 | 0.123595506 | R | R |
| s140 | 10.36363636 | S | S |
| s141 | 0.019367992 | R | R |
| s142 | 32.33333333 | S | S |
| s143 | 0.044932079 | R | R |
| s144 | 0.005025126 | R | R |
| s145 | 12.51351351 | S | S |
| s146 | 22.80952381 | S | S |
| s147 | 49 | S | S |
| s148 | 49 | S | S |
| s149 | 51.63157895 | S | S |
| s150 | 13.92537313 | S | S |
| s151 | 22.25581395 | S | S |
| s152 | 65.66666667 | S | S |
| s153 | 0.006036217 | R | R |
| s154 | 23.3902439 | S | S |

TABLE 1-continued

| Sample NO. | Exp(–k) | result of predicting system | Result of Broth micro dilution method |
|---|---|---|---|
| s155 | 11.65822785 | S | S |
| s156 | 0.016260163 | R | R |
| s157 | 0.033057851 | R | R |
| s158 | 0.024590164 | R | R |
| s159 | 0.016260163 | R | R |
| s160 | 9.752688172 | S | S |

The confusion matrix generated by the test result data is shown in Table 2:

TABLE 2

| confusion matrix | | predicting result | |
|---|---|---|---|
| | | R | S |
| real result | R | 30 | 1 |
| | S | 0 | 129 |

Assuming TP (True Positive) represents the number of true positive cases, FP (False Positive) represents the number of false positive cases, FN (False Negative) represents the number of false negative cases, and TN (Ture Negative) represents the number of true negative cases. Precision refers to the proportion of positive samples in the positive case determined by the classifier. The recall rate refers to the proportion of predicted positive cases to the total positive cases. Accuracy refers to the proportion of correct judgments made by the classifier on the entire sample. F1 score is the harmonic mean of accuracy and recall, with a maximum of 1 and a minimum of 0. The calculation results of each indicator are as follows:

$$\text{precision} = \frac{TP}{TP+FP} = \frac{30}{30+0} = 1$$

$$\text{recall} = \frac{TP}{TP+FN} = \frac{30}{30+1} = 0.968$$

$$\text{accuracy} = \frac{TP+TN}{TP+FP+TN+FN} = \frac{30+129}{30+1+129+0} = 0.994$$

$$F1 = \frac{2 \times \text{precision} \times \text{recall}}{\text{precision} + \text{recall}} = 0.984$$

The above examples only express the embodiments of the present invention, and their description is more specific and detailed, but they cannot be understood as a limitation on the scope of the invention patent. It should be pointed out that for an ordinary technical person skilled in the art, several deformations and improvements can be made without departing from the concept of the present invention, all of which fall within the scope of protection of the present invention. Therefore, the scope of protection of the present invention patent should be based on the claims.

The invention claimed is:

1. A method of predicting sensitivity of *Klebsiella* against meropenem, comprising:
   obtaining a microbial sample from a patient with pneumonia;
   isolating a candidate *Klebsiella* strain from the microbial sample;
   obtaining copy numbers of a plurality of genes in the candidate *Klebsiella* strain;
   calculating a k value according to the formula $$k = -1.44 + 0.708 \times \left(\frac{C1 - 0.223}{0.757}\right) - 0.660 \times \left(\frac{C2 - 0.951}{0.090}\right) + 0.088 \times \left(\frac{C3 - 0.952}{0.103}\right) + 3.048 \times \left(\frac{C4 - 0.469}{1.090}\right) - 0.460 \times \left(\frac{C5 - 0.196}{0.670}\right),$$

wherein, in the formula:
      C1 is the number of mphA gene copies in the candidate *Klebsiella* strain,
      C2 is the number of marA gene copies in the candidate *Klebsiella* strain,
      C3 is the number of *Klebsiella pneumoniae* KpnE gene copies in the candidate *Klebsiella* strain,
      C4 is the number of KPC-1 gene copies in the candidate *Klebsiella* strain, and
      C5 is the number of floR gene copies in the candidate *Klebsiella* strain;
   calculating an Exp(–k) power value with e=2.718281828459045 as base and –k as exponent, wherein an Exp(–k) power value of <1 corresponds to a prediction that the candidate *Klebsiella* strain is sensitive to meropenem, and an Exp(–k) power value of ≥1 corresponds to a prediction that the candidate *Klebsiella* strain is resistant against meropenem;
   predicting that the candidate *Klebsiella* strain is sensitive to meropenem; and
   administering meropenem to the patient in a medication treatment to treat the pneumonia based on the prediction in response to the prediction that the candidate *Klebsiella* strain is sensitive to meropenem.

2. The method of predicting sensitivity of *Klebsiella* against meropenem according to claim 1, wherein the number of mphA, marA, *Klebsiella pneumoniae* KpnE, KPC-1, and floR gene copies in the candidate *Klebsiella* strain are obtained through a second-generation high-throughput sequencing method.

3. The method of predicting sensitivity of *Klebsiella* against meropenem according to claim 2, wherein the number of gene copies in the candidate *Klebsiella* strain=depth of gene contigs/depth of genome contigs.

4. The method of predicting sensitivity of *Klebsiella* against meropenem according to claim 3, wherein:
   said genome contigs is the longest consensus sequence of those present in a plurality of contigs assembled from sequencing results by SPAdes version 3.13.0 software;
   said depth of genome contigs is calculated by SPAdes version 3.13.0 software; and
   said depth of gene contigs refers to a sum of depths of each contig which has said gene copies and said gene is located on.

5. The method of predicting sensitivity of *Klebsiella* against meropenem according to claim 4, wherein each contig which has said gene copies is annotated by BLAT version 36 software and DIAMOND version 2.0.4.142 software through CARD database alignment between said gene IDs and protein sequence.

6. The method of predicting sensitivity of *Klebsiella* against meropenem according to claim 4, wherein depths of each contig which has said gene copies and said gene is located on are calculated through SPAdes version 3.13.0 software.

\* \* \* \* \*